(12) United States Patent
Sadighian et al.

(10) Patent No.: US 9,818,082 B1
(45) Date of Patent: Nov. 14, 2017

(54) MANAGING A REMOVAL CHANNEL BASED ON INVENTORY CAPACITY

(71) Applicant: Amazon Technologies, Inc., Seattle, WA (US)

(72) Inventors: Ali Sadighian, Seattle, WA (US); Salal Humair, Sammamish, WA (US); Jun Tong, Bellevue, WA (US); Xiaochang Hu, Beijing (CN); Mahmoud Ahmed Bishr, Kirkland, WA (US); Chao Liu, Beijing (CN); Di Wu, Bothell, WA (US); Travis Francis Brayak, Seattle, WA (US); Patrick Ludvig Bajari, Bellevue, WA (US); Deepak Bhatia, Issaquah, WA (US)

(73) Assignee: Amazon Technologies, Inc, Seattle, WA (US)

( * ) Notice: Subject to any disclaimer, the term of this patent is extended or adjusted under 35 U.S.C. 154(b) by 0 days.

(21) Appl. No.: 15/009,607

(22) Filed: Jan. 28, 2016

(51) Int. Cl.
*G06Q 20/00* (2012.01)
*G06Q 10/08* (2012.01)
*G06G 1/14* (2006.01)

(52) U.S. Cl.
CPC .................................. *G06Q 10/087* (2013.01)

(58) Field of Classification Search
USPC ............................................................ 705/28
See application file for complete search history.

(56) References Cited

U.S. PATENT DOCUMENTS 8,321,302 B2 * 11/2012 Bauer .................. G06K 7/0008
705/22
2003/0216969 A1 * 11/2003 Bauer .................. G06K 7/0008
705/22

* cited by examiner

*Primary Examiner* — Garcia Ade
(74) *Attorney, Agent, or Firm* — Kilpatrick Townsend & Stockton LLP (57) ABSTRACT

Techniques for managing a removal channel may be described. In an example, a first estimate may be generated. The first estimate may be associated with removing a volume of items from an inventory space within a planning horizon through a removal channel. A decision to remove the volume of items may be accessed. The decision may be based on the first estimate and a second estimate associated with adding a capacity for inventorying an equivalent volume of items. Based on the decision, a constraint may be generated and imposed on an inventory level of an item during a time period of the planning horizon. A quantity of the item to remove within the time period through the removal channel may be estimated based on the constraint. Usage of the removal channel during the time period may be set based on the quantity of the item to remove.

16 Claims, 7 Drawing Sheets

MANAGING A REMOVAL CHANNEL BASED ON INVENTORY CAPACITY

BACKGROUND

A provider may rely on different channels to provide items to users. Example of such channels include a removal channel that may influence a user's decision to obtain an item. Generally, the provider's management of the channels is subject to different considerations and decisions. For example, the provider may make structural and parametric decisions given the available units of the item and the expected demand. The structural decisions may involve, for example, determining what channel(s) to use and when. In comparison, the parametric decisions may involve, for example, determining a quantity of the item per channel(s).

The provider typically implements different decision models to manage the channels, potentially resulting in fragmented decisions. This may lead to a sub-optimized channel management. For example, managing the removal channel may not consider a capacity to store certain units of an item as a variable. However, in certain situations, removing the item units may free up the capacity. In turn, the freed up capacity may be allocated to other channels. As such, by not considering the capacity as part of managing the removal channel, the different channels may be sub-optimally used. In addition, scaling up the decision models to large volumes of items and/or different types of channels may not be computationally feasible.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, managing a removal channel based on a capacity of an inventory. Typically, a service provider that provides a network-based resource, such as a web site for accessing an electronic marketplace, may operate various computing systems and associated modules to offer items at the network-based resource. Some of the items may be obtained from suppliers, sellers, and/or other entities, stored as inventory, and offered to customers as in-stock items. A customer may be enticed to purchase an in-stock item because of, for example, a shorter delivery flow. Over time, the volume of inventoried items may increase for different reasons. For example, some of the already inventoried items may remain unsold for a period of time. The service provider may use different techniques for removing some of the inventoried items through removal channels to free up capacity of the inventory.

Freeing up capacity may be equivalent to adding inventory capacity, where the addition would be accomplished through the appropriate physical means (e.g., building or leasing new storage). However, freeing up the capacity may also come at a cost. For example, the service provider may incur a loss from removing items. There may be a balance between freeing up capacity (e.g., saving on adding inventory capacity) and the cost of doing so. The volume of items to remove through the removal channels may be optimized based on this balance.

Embodiments described herein involve imposing a constraint on a level of inventory of an item as part of finding the optimal quantity of the item to remove. The parameters of the constraint (e.g., amount, type, duration, etc.) may depend on the balance between the saving and the cost applicable across the different items. In an example, a decision may be made about the total volume of items to remove over a planning horizon (e.g., a year). This decision may consider the cost of removing items versus the cost of adding new inventory capacity. The constraint may be derived from the decision. An analysis of the inventory level of the item may be performed for different time periods (e.g., on weekly basis) of the planning horizon (e.g., the year). The analysis may optimize the inventory level that should be kept within each time period and how different removal channels may be used to remove excess levels. The optimization may reduce (e.g., minimize) the loss from or increase (e.g., maximize) revenue of removing the quantity. The constraint may be used as one of the factors in the optimization. In an example, the analysis may use an optimization that implements an objective function. The objective function may search and find quantities to remove through respective removal channels, wherein the quantities may optimize an optimization parameter (e.g., maximize revenue, minimize cost) given the constraint. Once a quantity of the item and the removal channel(s) to use within a time period is determined, actual performance (e.g., the actual removed quantity) may be monitored. If deviation is detected (e.g., a lower or higher quantity was actually removed), the constraint may be updated for the analysis of the next time period.

To illustrate, consider an example of a service provider offering televisions, laptops, and phones. Near the end of each year (e.g., October), the customer demand for phones may surge (e.g., because of the holiday season). Adding extra inventory capacity to store phones for that time period may be possible but may come at a cost. However, a more efficient approach may involve removing some of the existing inventory of slow moving or unsold televisions and/or laptops. Different removal channels may exist including marking down, liquidating, and/or returning items to suppliers. An estimate for the least possible loss may be generated for removing different quantities of televisions and laptops through the different removal channels in time for the end of the year (e.g., by October). The quantities may be translated into inventory volumes based on known dimensions of the items. Based on the estimated loss and the cost of adding inventory capacity, a decision may be made to remove a particular inventory volume. That decision may be translated into a constraint, such as a penalty cost, to be imposed in an inventory management model.

The inventory management model may be run weekly to estimate the quantity of televisions and the quantity of laptops to remove per removal channel. The inventory management model may implement an objective function that optimizes revenue (or, conversely, loss). The objective function may use the constraint as one of the parameters. In particular, the objective function may search for the quantity to remove (or, conversely, the quantity to retain) through the different removal channels given the constraint, where the quantity would result in the optimal revenue. If a solution would result in retaining an unacceptable quantity with respect to meeting the volume removal decision, that solution may be penalized given the constraint and, thus, may not be optimal. The optimal solution would be one that may optimize the revenue while also observing the volume removal decision.

The inventory management model may accordingly output the quantity to remove per item and respective removal channel. For instance, the optimal solution may indicate that ten televisions should be marked down, six should be liquidated, and four should be returned within a week. Similar information may be outputted for laptops.

At the end of the week, the inventory levels for televisions and laptops may be checked to determine the quantities that were actually removed. The constraint may be updated (e.g., the penalty cost may be increased or decreased) based on the type and amount of deviations. For instance, if not enough quantity of televisions were sold through the markdown channel, the penalty cost may be increased. The update may also be a function of the remaining time until October (e.g., the time by which the inventory volume should be freed up). The closer to October, the more drastic the update may be (e.g., the larger the change to the penalty cost). That may ensure that the volume removal decision is properly executed by that time. Once updated, the inventory management model may be run again for next week and so on and so forth.

Figure 1:
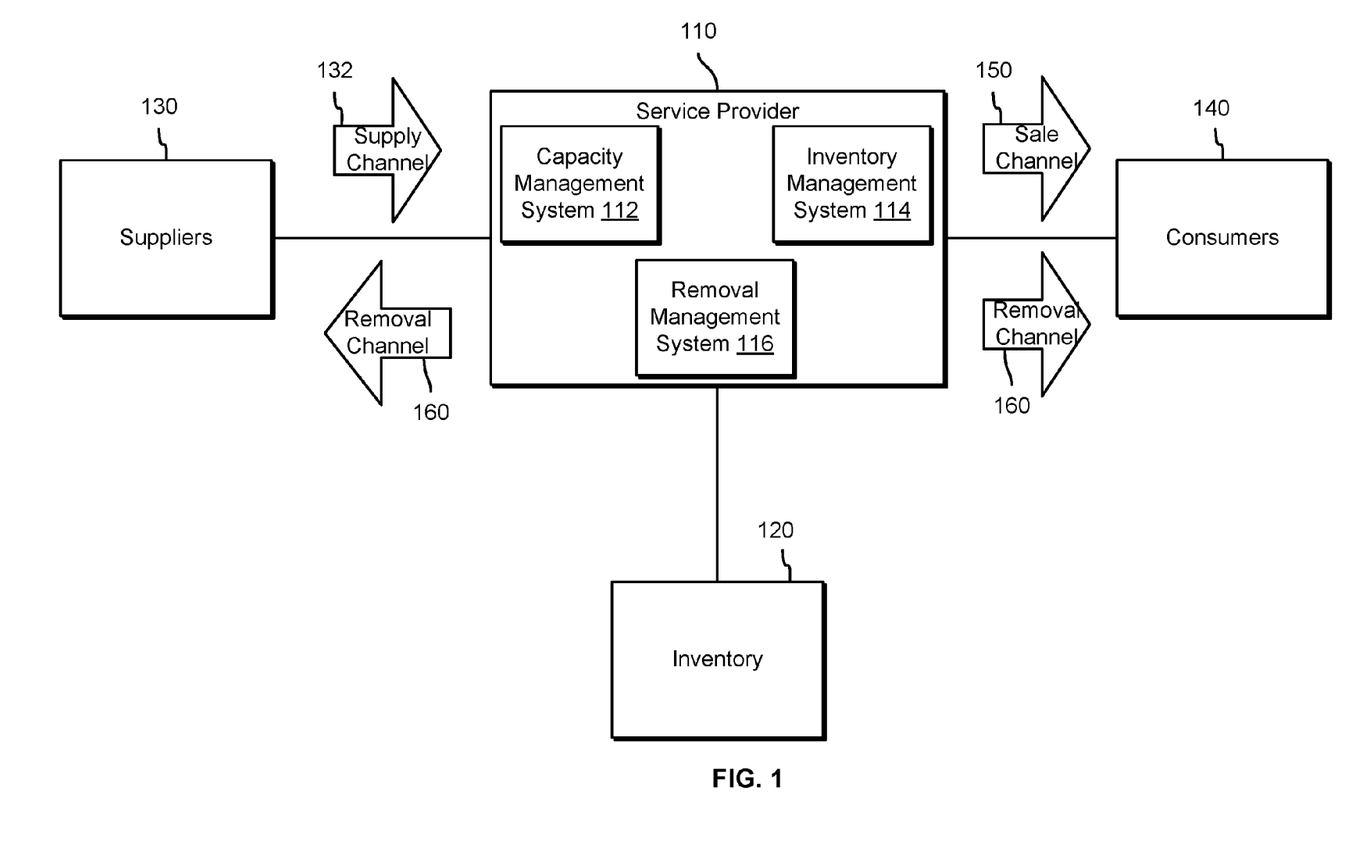
FIG. 1 is a block diagram illustrating an example environment for offering items at a network-based resource where the items may be available from an inventory, according to embodiments.

Turning to FIG. 1, the figure illustrates an example environment configured to use a constraint for removing items through removal channels, where the constraint may be derived based on a balance between freeing up and adding inventory capacity. More particularly, the illustrated environment includes a service provider 110 having access to an inventory 120 of items. The service provider 110 may obtain some of the items from suppliers 130 or from other sources. The service provider 110 may store the obtained items in the inventory 120 until ordered by customers 140. The customers 140 may include recipients or end-users of the items. However, not all of the items may be inventoried. Instead, the service provider 110 may facilitate a service for the customers 140 to obtain items directly from the suppliers 130 or from other sources.

In an embodiment, the service provider 110 may operate a network-based resource (e.g., a web site) as a part of an electronic marketplace, to provide various types of services. Generally, the network-based resource may provide network pages or documents (e.g., web pages) associated with and/or describing the items offered through the marketplace ("item pages" or "item detail pages"). An item page may include information about an item, such as descriptions of the item, related offers, identifiers of suppliers of the item, and other information. Among this information, the item page may display an in-stock attribute for the item. An in-stock attribute may represent an indication that the item may be or is about to be available in the inventory 120. In comparison, if the item is not available, the item page may display an out-of-stock attribute. The inventory 120 may include an inventory space that forms, for example, a warehouse, a fulfilment center, or some other storage resource for storing items.

The suppliers 130 may operate computing devices to access the network-based resource over a network. A supplier may represent a seller, reseller, retailer, merchant, manufacturer, vendor, and/or another entity involved in providing items. The access of a supplier may enable various types of supplier-related transactions, such as offering items, updating offers of items, and/or canceling offers. In an example, the suppliers 130 and/or the service provider 110 may also use the network-based resource to offer price matching, promotions, markdowns, and/or vendor-associated list prices (e.g., changes to offered prices) for particular items.

Similarly, the customers 140 may operate computing devices to also access the network-based resource over a network. A customer may represent an end user, a consumer, a recipient of the item, and/or a potential recipient or user associated with obtaining the item. The access of a customer may enable various customer-related transactions, such as browsing, searching, purchasing, returning, and/or reviewing items. In particular, a customer may access an item page associated with an item, review the information about the item, and make a purchasing decision. As part of the purchase decision, the customer may consider the in-stock attribute. For example, the customer may be enticed to purchase the in-stock item over an out-of-stock item because of the potentially shorter delivery time.

Several channels may exist for moving items in and out of the inventory 120. These channels may include a supply channel 132, a sale channel 150, and a removal channel 160. The supply channel 132 may represent a channel that the service provider 110 may use to acquire items from the suppliers 130 for storage in the inventory 120. For example, the supply channel 132 may include different infrastructures for ordering the items from the suppliers 130, for supplying the items from facilities of the suppliers 130, and for receiving the items at the inventory 120. In comparison, the sale channel 150 and the removal channel 160 represent channels that the service provider 110 may use to provide items from the inventory 120 to the customers 140 and/or the suppliers 130.

In particular, the sale channel 150 may be any channel other than a removal channel 160 available to a customer for ordering and receiving an item offered by the service provider 110. For example, the sale channel 150 may allow the customer to obtain the item at a regular sale price. The removal channel 160 may be a channel that the service provider 110 may use for removing items from the inventory 120 at an accelerated pace. Generally, reducing prices, advertisement, and/or other activities may be used in conjunction with the removal channel 160 to achieve the accelerated pace. For example, the removal channel 160 may include any or a combination of a markdown channel, a liquidation channel, an auction channel, a return channel, a donation channel, and/or a destruction channel. The markdown channel may allow the customers 140 to obtain items from the inventory 120 at marked down prices. The liquidation channel may allow the service provider 110 to offer items at a liquidated price to retailers and/or the customers 140. The auction channel may allow different entities to bid on items. The return channel may allow the service provider 110 to return to the suppliers 130 items that were acquired from the suppliers. The donation channel may allow the service provider 110 to donate items to third parties. The destruction channel may allow the service provider 110 to destroy items.

In an embodiment, the service provider 110 may implement various systems to manage operations of the inventory 120. The operations fall in multiple categories. One category may include operations to plan for acquiring volumes of items from the suppliers 130 through the supply channel 132 and store in the inventory 120 over a planning horizon. This planning may be based on expected demand of the customers 140 through the sale channel 150. Another category may include operations to plan for removing volumes of items from the inventory 120 through the removal channel 160. The description of the present disclosure focuses on the removal category.

As described herein above, removing items may free up capacity of the inventory 120 while incurring cost (e.g., higher revenue may have been generated from selling those items through the sale channel 160). As such, the various management systems may balance the benefits of freeing up capacity while incurring the cost. One way to achieve this balance may include efficiently managing the removal channel 160, such as by determining the optimal quantities of items to remove through the different types of the removal channel 160. The optimization may account for a constraint set according to the balance.

In particular, the management systems may include a capacity management system 112, an inventory management system 114, and removal management system 116. Each of these systems may represent a computing system hosting a management model configured to facilitate an aspect of removing items from the inventory 120. In an embodiment, some or all of the computing systems may be integrated as a single computing system.

The capacity management system 112 may be configured to perform long term (e.g., a year) strategic decisions with respect to how much capacity should be acquired. Capacity may represent a capacity to inventory a volume of items and may include storage capacity (e.g., cubic feet of storage) and resource capacity (e.g., manpower to handle and process items for storage). Generally, if the projected capacity (e.g., the how much should be acquired) is below what currently exists, no new capacity is needed; otherwise new capacity should be acquired. The capacity management system 112 may perform this analysis by estimating revenue (and hence demand) growth, as well as introduction of new items to the inventory 120.

The capacity management system 112 may be accessible to different operators of the service provider 110. One example operator may include a team that plans for adding (e.g., constructing or leasing) inventory space. Another example operator may include a team that plans to acquire items from the suppliers 130. In this example, the acquisition team may define how much storage capacity may be needed to store the acquired items.

The capacity may be acquired in different ways. One way may include adding new capacity in the form of, for example rentals, expansions or construction of new warehouses. Another way may include freeing up existing capacity by removing already inventoried items from the inventory 120 to open room for new items. A decision to free up existing capacity may be provided to the inventory management system 114. In particular, the capacity management system 112 may inform the inventory management system 114 about the amount and timing of that capacity (or, conversely, the amount and timing of inventory volume that should be removed).

In comparison, the removal management system 116 may be configured to perform short term (e.g., a week) strategic decisions with respect to how to use the removal channel 160. For example, the removal management system 116 may generate a plan for pricing an item per type of removal channel (e.g., a marked down price for use on a markdown channel) and/or for advertising the removal (e.g., advertising that the item is marked down). This may include outputting an operational decision of the right price at which to sell a given level of inventory over a given horizon.

The inventory management system 114 may function between the capacity management system 112 and the removal management system 116 and may be configured to marry the long and short term decisions to determine the optimal level of inventory to remove (or, conversely, retain). For example, the inventory management system 114 may generate a plan for how much inventory should be funneled to different types of the removal channel 160 or kept for future use. This system may be thought of as a faucet that controls the speed of inventory drain from the inventory 120 or as a variable size inventory that the capacity management system 112 may plan for periodically. The inventory management system 114 may translate the decision of the capacity management system 112 to free up capacity to actions in the removal channel 160. In turn, the removal management system 116 may execute these actions.

This operation framework of the management systems 112-116 may use a top-down approach of different levels. A first level may include a strategic planning at aggregate level to determine optimal capacity to free. A second level may include an execution of the plan to free up the capacity (e.g., item removal) at an item level to achieve maximum recovery (e.g., minimize loss) while meeting the aggregate cubic space target.

At the strategic planning level, the objective may involve deciding how much capacity to free up by a certain date. The costs may include the loss of the net present value (NPV) of revenue (freeing up more capacity results in losing more value). The benefits may include saving the costs of adding new capacity. The inventory management system 114 may compute a curve that describes the capacity (e.g., in cubic feet) freed up through removals versus the NPV loss. This curve may be used to make the decision for a capacity target by determining the trade-off between freeing up capacity by incurring an NPV loss against acquiring more capacity through additional cash outflow.

At the execution level, although still trying to maximize the revenue recovery (e.g., minimize the loss), the removal management system 116 may be bounded to meet the strategic goals (e.g. freeing up the capacity). Based on the capacity target, the inventory management system 114 may generate certain parameters for using the removal channel 160, such as timing of use, quantity per item, and value per item if removal not met. The removal management system 116 may maximize the revenue recovery given these parameters and accordingly use the removal channel.

As such, the top-down approach may enable a decision to set a constraint on the capacity (e.g., how much volume should be removed), subordinate remaining decisions to this constraint, and derive the best possible allocation of inventory to the removal channel 160. In addition to financial benefits (e.g., maximizing recovery) and improving underlying inventory systems and planning tools, this approach may result in technical advantages including improved usage of computing resources to resolve an optimization problem. For example, the approach may create a framework to break a large complex intractable optimization problem to multiple tractable pieces. Each tractable piece may be solved in a modular way. In other words, by having each of the systems 112-116 use a respective planning model, the capacity management system 112 may generate an optimal capacity decision, the inventory management system 114 may generate an optimal inventory level decision (e.g., by removing items through the removal channel 160), and the removal management system may generate an optimal plan for using the removal channel 160. As such, a large optimization model may be broken into tractable and resolvable pieces. In addition, the minimal amount of information may be passed between the management systems 112-116 to keep such systems coordinated and reduce extra work, thereby improving usage of computing resources (e.g., by reducing the needed processing power and memory space).

Figure 2:
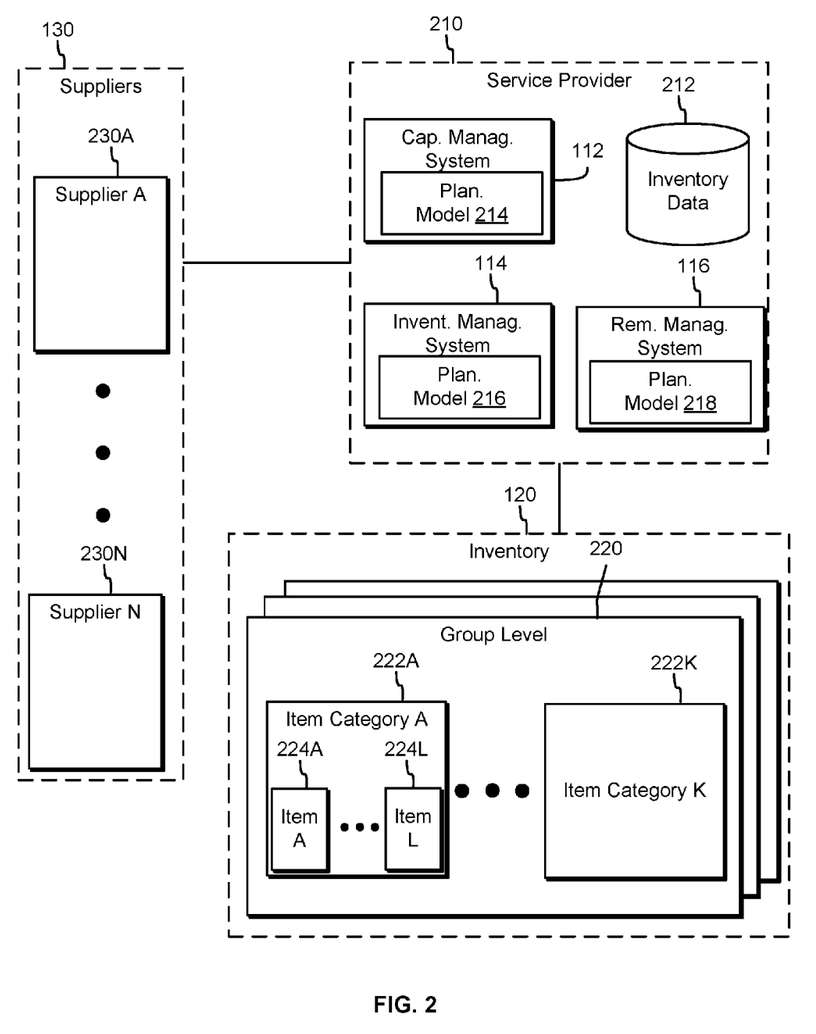
FIG. 2 is a block diagram illustrating example systems associated with inventorying items, according to embodiments.

FIG. 2 illustrates an example of an environment for using the management systems 112-116 to remove items from the inventory 120 through the removal channel 160. In particular, the service provider 110 may operate a computing system 210 to manage inventory data 212. The computing system 210 may host the management systems 112-116 (or the respective planning models of such systems), where such systems 112-116 may access and analyze the inventory data 212 to generate a removal plan. The removal plan may include the capacity target (e.g., inventory volume removal target) and the short term actions to meet the target. The computing system 210 may be configured to output the removal plan as a service or may be implemented as specialized computing hardware configured to access and analyze the inventory data 212 and output the removal plan.

A database or some other storage type may store the inventory data 212. The inventory data 212 may represent data related to the inventory 120. For example, the inventory data 212 may include historical and/or estimated data related to offered, ordered, purchased, marked down, liquidated, and/or returned items. Some of the data may be stored in the database based on transactions associated with users (e.g., the service provider 110, the suppliers 130, the customers 140, or other operators). For example, the inventory data 212 may include historical supply and demand realizations of items. A historical supply realization of an item may represent a set of observed values indicating the actual supply for the item over a period of time through the supply channel 132. A historical demand realization of an item may represent a set of observed values indicating the actual demand for the item over a period of time through the sale and removal channels 150 and 160 (e.g., the number of units sold, the number of users who requested information about the item, and/or other metrics to measure a demand value). Similarly, the inventory data 212 may include data about supply expansion costs (e.g., to add new inventory capacity), revenues, profits, losses, lead times, volumes of items (e.g., measurement of items including storage dimensions in, for instance, cubic feet). Other data may be stored in the database based on an analysis of the already-stored data. For example distribution functions, discrete statistics (e.g., averages, variances, ranges) may be generated from the historical data and stored as a part of the inventory data 212.

The computing system 210 may be configured to access and analyze the inventory data 212 to generate the removal plan. For example, the computing system 210 may implement different planning models for analyzing different portions of the inventory data 212. One planning model 214 may relate to the capacity management system 112 and may be configured to generate a decision with respect to a capacity target that should be freed up over a long term planning horizon. Another planning model 216 may relate to the inventory management system 114 and may translate the capacity decision into actions for item removal over the removal channel 160. An action may instruct a quantity of an item to be removed within a time period through the removal channel 160 (e.g., how many units of an item should be marked down, liquidated, and/or returned, and by what date). The planning model 216 may generate a constraint based on the capacity target and may use the constraint in an objective function configured to optimize recovery (e.g., maximize revenue or minimize loss) by searching for the optimal quantities of the different items to remove over the removal channel 160. Yet another planning model 218 may relate to the removal management system 116 and may translate the actions generated by the inventory management system 114 into an execution plan. For example, the planning model 218 may also use an objective function to optimize recovery per item given that a certain quantity of the item should be removed within a time period. An output of the objective function may include, for example, pricing per item over the removal channel 160.

The outputs of each of the planning models 214-218 may be used by the computing system 210 to generate the removal plan. In an example, the removal plan may include the target capacity over the long term planning horizon, the quantity to be removed per item, per removal channel type, and per short term time period, and usage parameters (e.g., pricing per item) of the removal channel 160. Further, one or more of the planning models 214-218 may provide interfaces to allow user access to corresponding portions of the removal plan. The interfaces may include web interfaces and/or application programming interfaces (APIs). Thus, a user such as the service provider 110, the suppliers 130, and/or others may request a portion of or the entire removal plan and receive the appropriate response. In other words, the computing system 110 may provide a removal planning service not only to the service provider 110, but also to other users. As such, a supplier storing items in the inventory 120 (or in another inventory having inventory data accessible to the computing system 110) may use the removal planning service through a web or API call to receive a respective removal plan. Thus, the optimization may also be extended to the supplier 130 and similarly to other entities with proper access controls.

In an embodiment, operators of the inventory 120 may operate various computing systems to interface with the computing system 210. The operators of the inventory 120 may be the same or a different entity than the service provider 110. In an example, some or all of the operators may represent automated processes and computing services. In particular, the operators may provide information about group levels 220, item categories 222, and items 224. An item category may represent a collection of items that may share at least one common feature. For example, digital single-lens reflex (DSLR) cameras from different manufacturers may belong to a same item category of DSLR cameras. A group level may represent a group of item categories that may share at least one common feature. For example, a DSLR camera category and a digital compact camera category may belong to a same group of digital cameras. The hierarchy between items, item categories, and group levels may be repeated at multiple levels.

The provided information may include, for example, an identifier of a group level, identifiers of item categories within that group level, identifiers of items within one category, and/or quantities of stored items. This information may also include observed values for various variables and constraints per group level, item category, and/or item. For example, the information may include observed demands, lead times, prices, returns, and other variable-related information.

The suppliers 130, illustrated as suppliers 230A-N, may likewise operate computing systems to interface with the computing system 210. As explained herein above, the interface may be facilitated via web interfaces and/or APIs such that the suppliers 130 may subscribe to the removal planning service of the computing system 210. Each of the suppliers 230A-N may provide items of a same item category or of different item categories. Further, each of the suppliers 230A-N may be associated with supplier lead times, supplier offers, and return policies. A supplier lead time may represent a lead time for a supplier to provide (e.g., manufacture and deliver) or return (e.g., handling, processing, refurbishing, etc.) quantities of an item. A supplier offer may represent an offer for an item including, for example, a price, a promotion, a markdown, and/or a price match option. The supplier offer may impact the demand of the item. A supplier return policy may indicate terms and conditions to return quantities of an item including, for example, return pricings. By interfacing with the computing system 210, the suppliers 230A-N may input information associated with the various items including the supplier lead times, offers, and return policies. In turn, this information can be stored as part of the inventory data 212.

Hence, by implementing the computing system 210, the service provider 110 may access removal plans. The generation of the removal plans may be automated based on maintaining the inventory data 212 up-to-date. On a periodic basis (e.g., monthly), the long term capacity target may be adjusted. Similarly, on a periodic basis (e.g., weekly), the short term removal actions may be adjusted. Various feedback loops may be used within the computing systems 210 (e.g., between the management systems 112-116) to improve the removal plan and the execution of the removal plan. Example feedback loops are further illustrated in FIG. 3.

Figure 3:
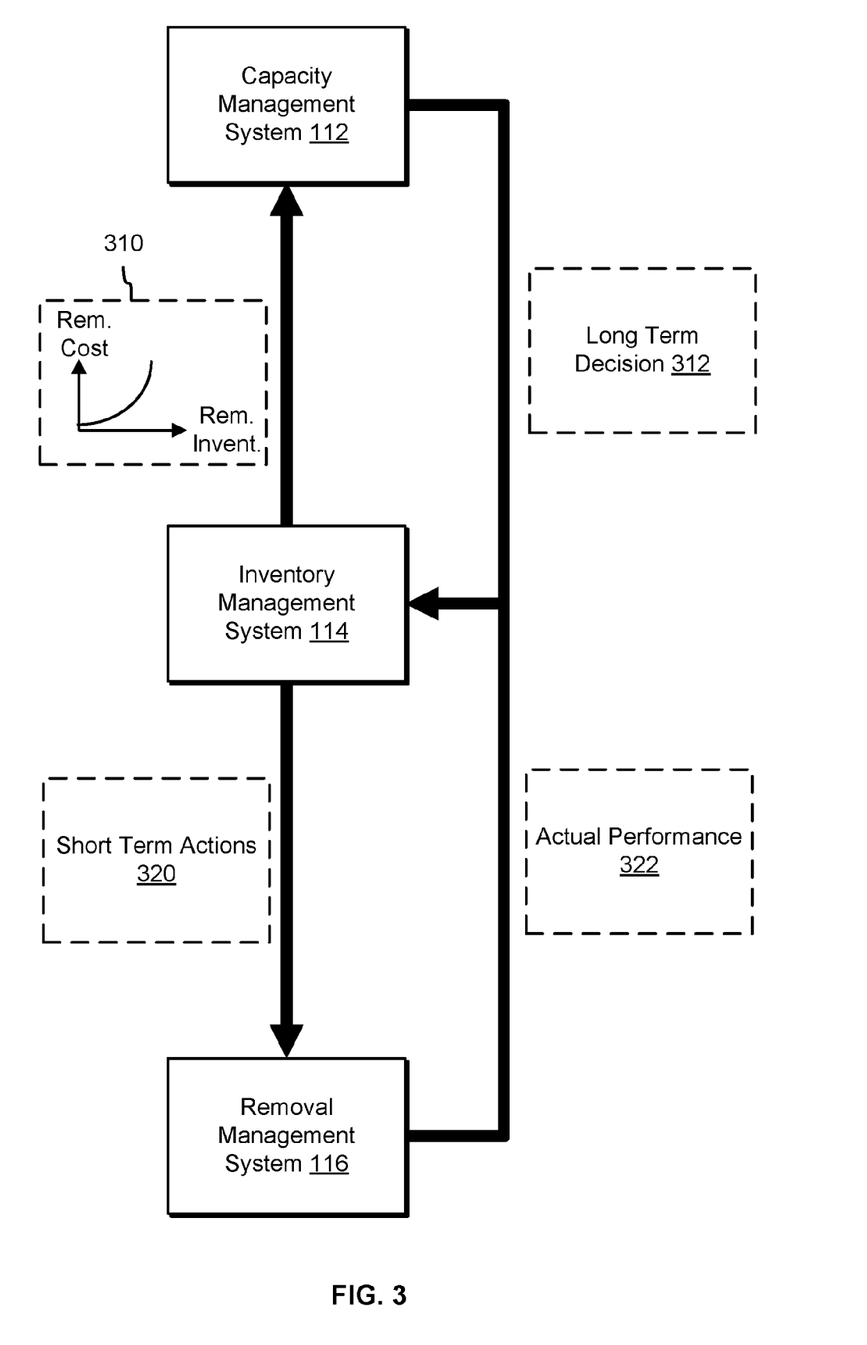
FIG. 3 illustrates example models configured to determine quantities associated with removing inventoried items, according to embodiments.

Turning to FIG. 3, the figure illustrates example interactions between the management systems 112-116. In an embodiment, the interactions may use the minimal amount of information, thereby improving usage of computing resources. In addition, by configuring each of the management systems 112-116 to separately resolve a piece of a large complex optimization problem, an optimal solution may be found (unlike existing systems that may not be capable of resolving the large complex optimization problem optimally).

As illustrated, the inventory management system 114 may sit between the capacity management system 112 and the removal management system 116. Interactions may be performed through APIs between these systems. The inventory management system 114 may translate the long term capacity target planned by the capacity management system 112 into short term removal actions usable to the removal management system 116. In addition, the inventory management system 114 may use feedback loops to improve the optimization over time.

The inventory management system 114 may provide the capacity management system 112 with an estimate 310 about a cost for removing items and thereby freeing up inventory volume and capacity. In an example, the estimate 310 may include an optimal cost-of-removal curve. The curve may represent the least possible NPV loss incurred in meeting a certain capacity constraint (units/cubic feet of inventory) at a fixed time in the future. In response, the capacity management system 112 may provide a decision 312 to the inventory management system 114. The decision 312 may represent decision to free up a capacity target over a long term planning horizon. The capacity management system 112 may generate the decision 312 based on the estimate 310 and on a second estimate for adding new inventory capacity. As such, the decision 312 may balance the NPV loss with the cost of adding new inventory. In an example, the decision 312 may include a selection of a capacity constraint from the curve. The interactions between the inventory management system 114 and the capacity management system 112 may be repeated periodically (e.g., on a monthly basis) to set new capacity targets and/or refine existing capacity targets.

Once the decision 312 is received, a constraint on the inventory level in the future may be set. In an example, the inventory management system 114 may implement the constraint by using an internal penalty cost ($ per cubic feet per time period) on the inventory. The penalty cost may be imposed on different time periods of the planning horizon (e.g., on a weekly basis for a one year horizon). As time passes, the penalty cost may be modified such that the goal of meeting the capacity target may be achieved by the end of the planning horizon. The inventory management system 114 may use a planning model that implements an objective function. The objective function may output the quantity (e.g., number of units) to be removed per item, type of removal channel (e.g., markdown, liquidation, return, etc.), and time period and a removal value (e.g., price) per unit if not removed according to the planned removal. The inventory management system 114 may pass the outputs of the objective function to the removal management system 116. The outputs may be provided as a set of short term actions 320 that indicates the quantity to remove per item, removal channel type, and time period and the removal value.

In turn, the removal management system 116 may calculate values of the items (e.g., selling prices per type of removal channel) based on the set of short term actions 320 received from the inventory management system 114. For example, the removal management system 116 may use data from this set as input to its objective function. The objective function may consider various potential realizations of user demand at various price points to optimize recovery. The output of the objective function may include the item values.

In an example, the inventory management system 114 may observe actual performances 322 of the removal channel at the end of each time period (e.g., how many marked down items were actually removed on a markdown channel may be observed on a weekly basis). The actual performance 322 may be used to re-adjust the penalty cost and output the set of actions 320 for remaining time periods of the planning horizon.

As illustrated in FIG. 3, the capacity management system 112 may become the main system looking at the long range making the appropriate tradeoffs to decide the value of each cubic feet of storage on its side. This planning may account for uncertainties and tradeoffs inherent in long range planning, thereby taking these complexities out of the remaining management systems 114-116 (e.g., the planning models of the remaining management systems 114-116 need not model for these complexities).

In comparison, the inventory management system 114 may become the main manager of complexities inherent in removing inventory (returns, anticipated target inventory positions, modifying forecasts to account for product lifecycles, etc.). The inventory management system 114 may use long range guidance from the capacity management system 112 to coordinate removal of inventory through different removal channels, to maximize recovery subject to capacity constraints. The inventory management system 114 may coordinate with the removal management system 116 by deciding end dates for different time periods associated with removal of items to meet future capacity constraints.

The removal management system 116, utilizing the given set of actions 320 from the inventory management system 114, may compute item values for the removal channel (e.g. selling prices). The removal management system 116 may apply business pricing logic without the need to explicitly consider other complexities considered by the inventory management system 114 and/or the capacity management system 112.

Figure 4:
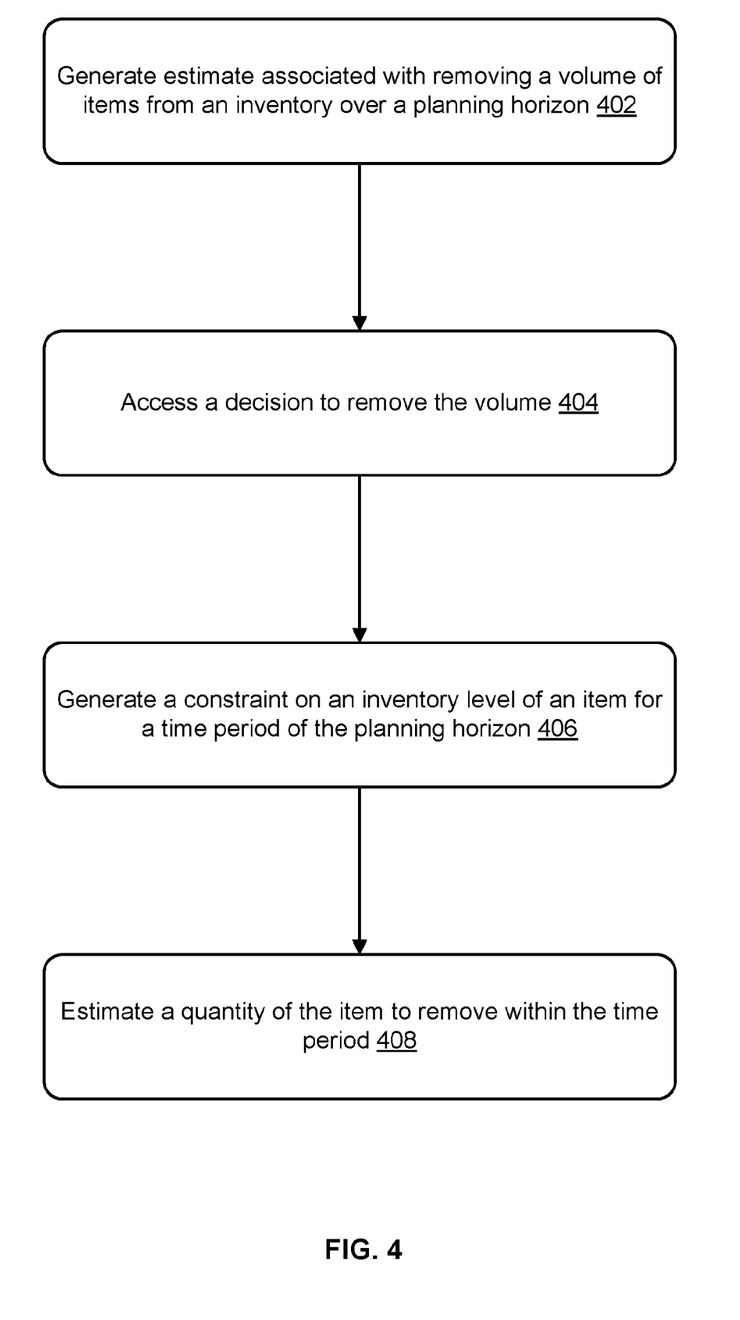
FIG. 4 illustrates an example flow for determining a quantity of an inventoried item to remove, according to embodiments.
Figure 5:
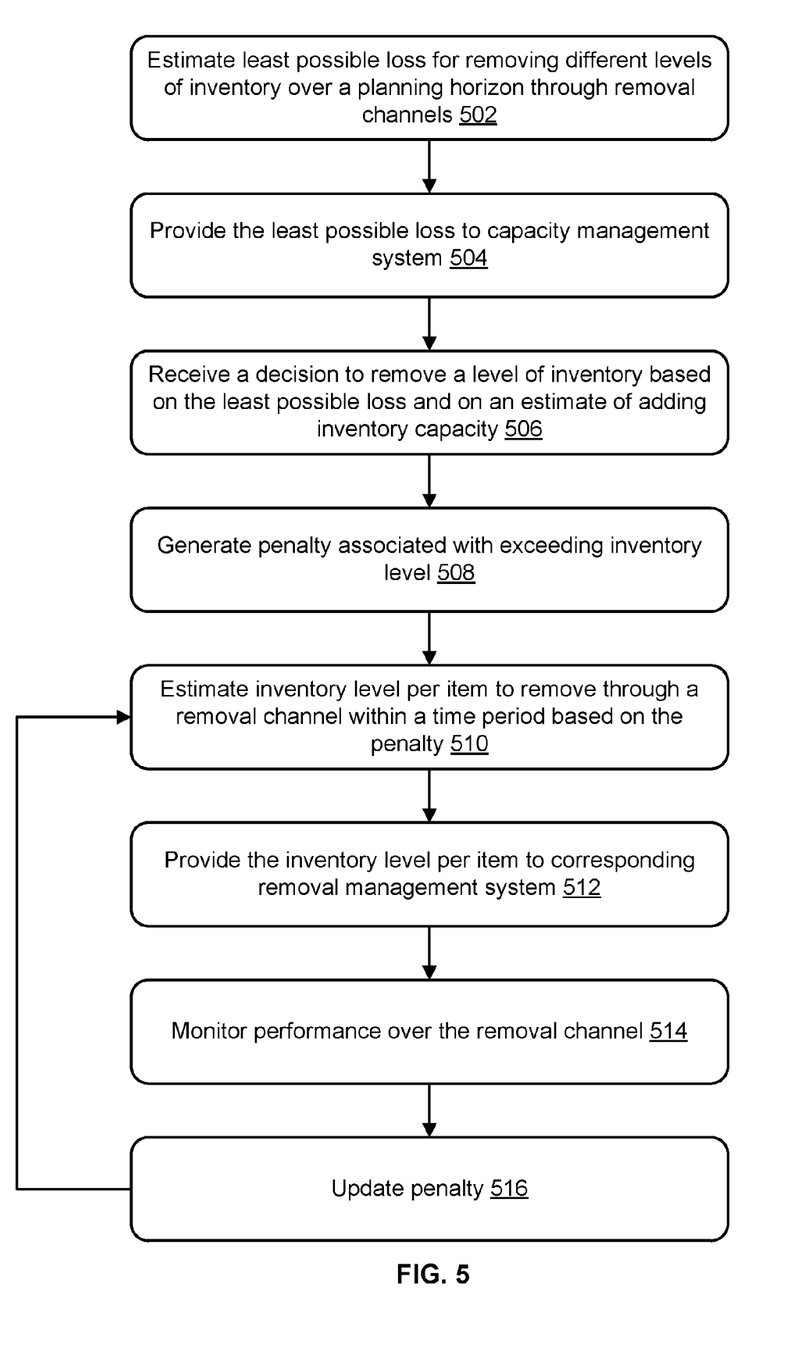
FIG. 5 illustrates an example flow for removing a quantity of an inventoried item, according to embodiments.

Turning to FIGS. 4-5, the figures illustrate example flows related to generating a removal plan that may include a target capacity over a planning horizon and executable actions within time periods of the planning horizon to meet the target capacity. In particular, FIG. 4 illustrates an example flow for estimating a quantity to remove within a time period based on a target capacity. In comparison, FIG. 5 illustrates an example flow for estimating the quantity based on a constraint in the form of a penalty, where the constraint may be based on the target capacity. Some operations across the example flows may be similar. Such similarities are not repeated herein in the interest of clarity of explanation.

In the illustrative operations, some of the operations or functions may be embodied in, and fully or partially automated by, modules executed by one or more processors. For example, a computing system, similar to the computing system 210 of FIG. 2, may be configured to perform some of the operations. While the operations are illustrated in a particular order, it should be understood that no particular order is necessary and that one or more operations may be omitted, skipped, and/or reordered.

The example flow of FIG. 4 may start at operation 402, where an estimate associated with removing a volume of items from an inventory over a planning horizon may be generated. In an example, the computing system may generate the estimate in the form of a cost (e.g., a loss) incurred from removing the volume of items over different types of removal channel (e.g., markdown, liquidation, auction, and/or return channels). The cost may represent an optimal recovery (e.g., may minimize the loss) and may be generated by using an objective function. For each volume of items that can be removed, that volume may be translated into quantities of items (e.g., based on storage dimensions of the items). The removed volume may represent a freed up inventory capacity. For each volume, the objective function may search for the quantities of items to remove over the different removal channel types that may result in the removal of that volume while also optimizing the recovery. This search may use different variables including, for example, the quantities, demand distributions over the different removal channel types, unit prices, capacity constraints, holding costs, and other cost-related variables.

At operation 404, a decision to remove the volume may be accessed. The decision may represent a selection of the volume from the different volumes based on the respective estimates (e.g., costs). As such, the volume may become a target volume to remove and the equivalent capacity may become a target capacity to free up by the end of the planning horizon. The decision may balance the cost of removing the volume with the cost of adding new inventory capacity corresponding to that volume. The cost of adding new inventory may be estimated based on different parameters including, for example, the cost of leasing and/or building new storage space, adding manpower to operate the new storage space, and/or other inventory capacity-related parameters. In an example, the computing system may receive the decision from another computing system and/or may locally generate the decision.

At operation 406, a constraint on an inventory level of an item for a time period of the planning horizon may be generated. In an example, the computing system may set the constraint as a penalty (e.g., a penalty cost in the form of $ per cubic feet per time period). The penalty may ensure that remaining inventory levels may not occupy a volume in excess of the target volume by the end of the planning horizon. The computing system may select the penalty from a predefined range of penalties and may, over time, update the penalty to other values of the predefined range based on actual removal performances.

At operation 408, a quantity of an item to remove within the time period may be estimated. In an example, the computing system may use the constraint to estimate the quantity to remove per item, time period, and removal channel type. An objective function may be used for this estimation. The objective function may use the constraint (e.g., the penalty) as an input and may search for the quantity per item, time period, and removal channel type, where the quantity may optimize recovery (e.g., minimize loss).

This search may be recursive. For instance, the search may start with the last time period of the planning horizon (e.g., when the target volume should be absolutely met) and move through previous time periods all the way up to the current time period (e.g., the immediate next week). In each time period, the objective function may output the quantity that may optimize the recovery given the constraint (e.g., penalty) and given different variables applicable to that time period (e.g., projected consumer demand, prices, costs, etc.). For the last time period, a target inventory level may be set. This target inventory level may meet the target volume (e.g., the targeted quantity may not occupy a volume that exceeds the target volume). The objective function may estimate the quantity for the last time period. That target inventory level minus the estimated quantity may be set at the target inventory level of the previous time period. The objective function may then be applied again. This process of updating the target inventory level and applying the objective function may be recursively applied all the way to the current time period.

Once the quantity per item, time period, and removal channel type is estimated, that quantity may become part of the removal plan. The removal plan may include the quantities for the different items and time periods. Execution of the removal plan may be monitored over time by tracking the actual performance (e.g., quantities that are being removed versus the planned quantities). At time intervals or on a periodic basis (e.g., by the end of each time period), operations 406-408 may be repeated to update the removal plan based on the actual performance, thereby ensuring that the target volume may be met by the end of the planning horizon.

FIG. 4 illustrate an example flow implemented on a computing system. In comparison, FIG. 5 illustrate a similar example flow implemented on different management systems, such as a capacity management system, an inventory management system, and a removal management system. Each of these system may host a planning model. Collectively, the systems may be a part of the computing system illustrated in connection with FIG. 4.

The example flow of FIG. 5 may start at operation 502, where the least possible loss (e.g., NPV) for removing different levels of inventory over a planning horizon through removal channels may be estimated. In an example, the inventory management system may generate this loss as a first estimate to be balanced against a second estimate associated with adding new inventory capacity. The inventory management system may use a planning model that implements an objective function to output the least possible loss.

The loss may correspond to removing a volume of inventoried items and, thus, may be applicable to a combination of items (e.g., televisions, laptops, phones, etc.) rather than a single item. The objective function may consider the different combinations of items as a decision variable. Further, a penalty (e.g., a constraint) may be imposed to meet the target volume (as further described in the next operations of the example flow of FIG. 5). The objective function may also use the penalty as a decision variable or parameter (e.g., the value of which may vary within a predefined range) such that the penalty may be inherently considered in outputting the least possible loss and, subsequently, deciding on the target volume. As such, the objective function may use dual variables: one related to the combination of items or an aggregate inventory level, and one related to a penalty within a range. The planning model may be run for each of items separately and at multiple values of the penalty within the range to derive the least possible loss. This use of the planning model and objective function may be expressed as:

$$V = \max_{x \in \cup S_a} \sum_a \pi_a(x_a)$$

$$s.t. \sum_a InventoryCube_{a,EOPH}(x_a) \leq K$$

which in turn may be expressed as a set of separable optimization problems:

$$V(a|\tilde{p}) = \max_{x_a \in s_a} \pi_a(x_a) - \tilde{p} * InventoryCube_{aEOpH,\tilde{p}}(x_a).$$

"V" may represent the least possible loss (or, conversely the maximum possible profit or revenue), "a" may represent an item, "$\pi_a$" may represent an objective function for an item "a," "$x_a$" may represent a decision variable within a set of possible decisions "$S_a$," "$InventoryCube_{a,EOPH}$" may represented the expected inventory level of item "a" under the decision variable "$x_a$" at the end of the planning horizon "EOPH," and "$\tilde{p}$" may represent the penalty in the range of $[\tilde{p}_l, \tilde{p}_u]$, where "$\tilde{p}_l$" may potentially be zero and "$\tilde{p}_u$" an arbitrary high number that may result in very aggressive removals that may not be optimal.

At operation 504, the least possible loss may be provided to a capacity management system. In an example, the inventory management system may output the least possible loss to the capacity management system over an API. As outputted, the least possible loss may correlate the different losses corresponding to the different removal volumes of inventory. For instance, the least possible loss may be plotted as curve for presentation at a user interface. One axis of the plot may show the removal volume and another axis show the least possible cost. The plot may use the following equation:

$$\left( \sum_a CurrentInventoryCube_a - \sum_a InventoryCube_{a,EOPH,\tilde{p}}, \right.$$
$$\left. \sum_a V(a|0) - V(a|\tilde{p}) - \tilde{p} * InventoryCube_{a,EPOH,\tilde{p}} \right)$$

At operation 506, a decision to remove a level of inventory over the planning horizon may be received. In an example, the inventory management system may receive the decision from the capacity management system over an API. The decision may be based on the least possible loss. For instance, the capacity management system may use a planning model that may balance the least possible loss against the cost of adding new inventory capacity. This planning model may consider different parameters, such as costs of leasing or building new storage space, to generate the second estimate (e.g. the cost of adding new inventory capacity). The planning model may select the target volume to be removed such that the corresponding least possible cost may not exceed the cost of adding a corresponding inventory capacity. The target volume may represent the level of inventory to be removed by the end of the planning horizon.

At operation 508, a penalty associated with exceeding the level of inventory may be generated. The penalty may be used as a constraint to ensure that actions to remove different items over different removal channels may result in removing the target volume over the planning horizon. In an example, the inventory management system may generate the penalty based on the removal decision. For instance, the penalty may be selected from the predefined range, where the selected value may reflect an aggressiveness to remove items (e.g., the larger the value, the more aggressive the removal plan may be). In another illustration, the penalty may be set as a default value of the range (e.g., the mean of the range). In yet another illustration, the volume target may correspond to a particular least possible loss. That particular loss may have been generated with a particular penalty value under operation 502. The inventory management system may set the penalty to that particular penalty value.

At operation 510, the inventory level to remove per item, per removal channel (e.g., markdown channel, liquidation channel, return channel, etc.), and per time period may be estimated based on the penalty. In an example, the inventory management system may use an objective function at the item level (e.g., "$\pi_a$") to output the quantity (e.g., the inventory level) to remove for that item. For each time period, the objective function may use the penalty as an input and may optimize the recovery by searching for the quantities of the item to remove through the different removal channels given different applicable parameters for that time period (e.g., the expected customer demand). As described in connection with FIG. 4, the estimation may be recursively performed starting with the last time period and moving back to the current time period.

At operation 512, the inventory level per item and per removal channel and for a next time period (e.g., for next week) may be provided to the removal management system. As such, the quantities of televisions to be marked down, liquidated, and/or returned within the next week may be provided to the removal management system. Similar data may also be provided for other items (e.g., laptops, phones, etc.). In an example, the inventory management system may output this data as a set of actions to the removal management system over an API. In addition, the inventory management system may output for each item a removal value (e.g., a price) of the item. The removal value may be generated as an output of the objective function and/or based on historical data about removing the item.

In turn, the removal management system may use a planning model for setting different parameters of the removal channels, such as estimating the prices of the items, planning for advertisement, etc. The planning model may implement an objective function for some or all of the removal channels. For example, the planning model may implement one objective function to compute the pricing (e.g., and any other values) of an item to be marked down through a mark down channel. The planning model may implement another objective function to compute the liquidation pricing through the liquidation channel. Generally, an objective function associated with a removal channel may use, as inputs, the respective removal quantity of an item and, optionally, the removal value. Based on these inputs, the objective function may optimize the recovery within a time period by searching and outputting the value (e.g., price) that may result in the optimal recovery given different parameters of the time period (e.g., expected customer demand at different pricing levels). As such, an objective function of the markdown channel may consider the quantity of televisions to be removed and the television removal value for the next week and may output the marked down price of televisions for the next week that may minimize loss or maximize revenue.

At operation 514, actual performance over the removal channels may be monitored. For example, the quantities of items actually removed may be tracked at time intervals (e.g., at the end of each time period of the planning horizon). The inventory management system may access and compare these quantities to respective target inventory levels per time period. The comparison may be performed at different granularity levels. At one granularity level, the inventory management system may consider the total volume of removed inventory at the end of a current time period and compare that total level to a respective target volume. At another granularity level, the inventory management system may perform the comparison per item. Yet at another granularity level, the comparison may be performed per removal channel. A deviation between what was targeted and what was actually removed may result in adjusting the penalty and updating the removal plan. A negative deviation (e.g., actual removal volume lower than targeted removal volume) may result in increasing the penalty. For instance, if ten televisions should have been removed during a current week, but only eight were actually removed, the inventory management system may increase the penalty for the next time period and re-estimate the quantity of televisions to remove during the next time period based on updated penalty. Conversely, a positive deviation may result in decreasing the penalty.

At operation 516, the penalty may be updated based on a deviation. In an example, the inventory management system may increase the penalty for a negative deviation and decrease the penalty for a positive deviation. For instance, a bisection search for the penalty within the predefined range of penalty values may be used. To reduce usage of computing resources when searching for the penalty, a cap on the number of iterations may be applied. In addition, linear interpolation may be used. The bisection search may follow the following steps:

0—Consider the original interval $[\tilde{p}_l, \tilde{p}_u]$;
1—Assume the current penalty value is $\tilde{p}$. Calculate a run with $\tilde{p}$
   a. If expected inventory at the end of the planning horizon is above target: $\tilde{p}_l \leftarrow \tilde{p}$
   b. If the expected inventory is below target: $\tilde{p}_u \leftarrow \tilde{p}$ (assume this setting for interest of brevity in the next steps);
2—Run the planning model of the inventory management system with $\tilde{p}_l$
3—If expected inventory of new run is below the target then stop use $\tilde{p}_l$ for the next time period. In addition, sound an alarm that the previous removal may have been too aggressive;
4—Set $$\tilde{p} \leftarrow \frac{\tilde{p}_l - \tilde{p}_u}{2},$$

Counter=1 and run planning model of the inventory management system with $\tilde{p}$;
5—Calculate expected inventory of the new run;
   a. If the expected inventory is above target: $\tilde{p}_l \leftarrow \tilde{p}$
   b. If expected inventory is below target: $\tilde{p}_u \leftarrow \tilde{p}$
6—Increase iteration counter by one
7—If iteration counter does not exceed cap, go to step 4; otherwise continue
8—Calculate the new penalty term based on a linear approximation of $(\tilde{p}_l, \text{Inventory}(\tilde{p}_l))$ and $(\tilde{p}_u, \text{Inventory}(\tilde{p}_u))$.

Once the penalty is updated (whether the update results in a change to the penalty or not), the inventory management system may perform operation 510 to estimate the respective quantities of items to be removed in the next time period. As such, operations 510-516 may be repeated at time intervals (e.g. at the end of each time period) throughout the planning horizon such that, for each time period, the optimal quantities to remove may be estimated.

Figure 6:
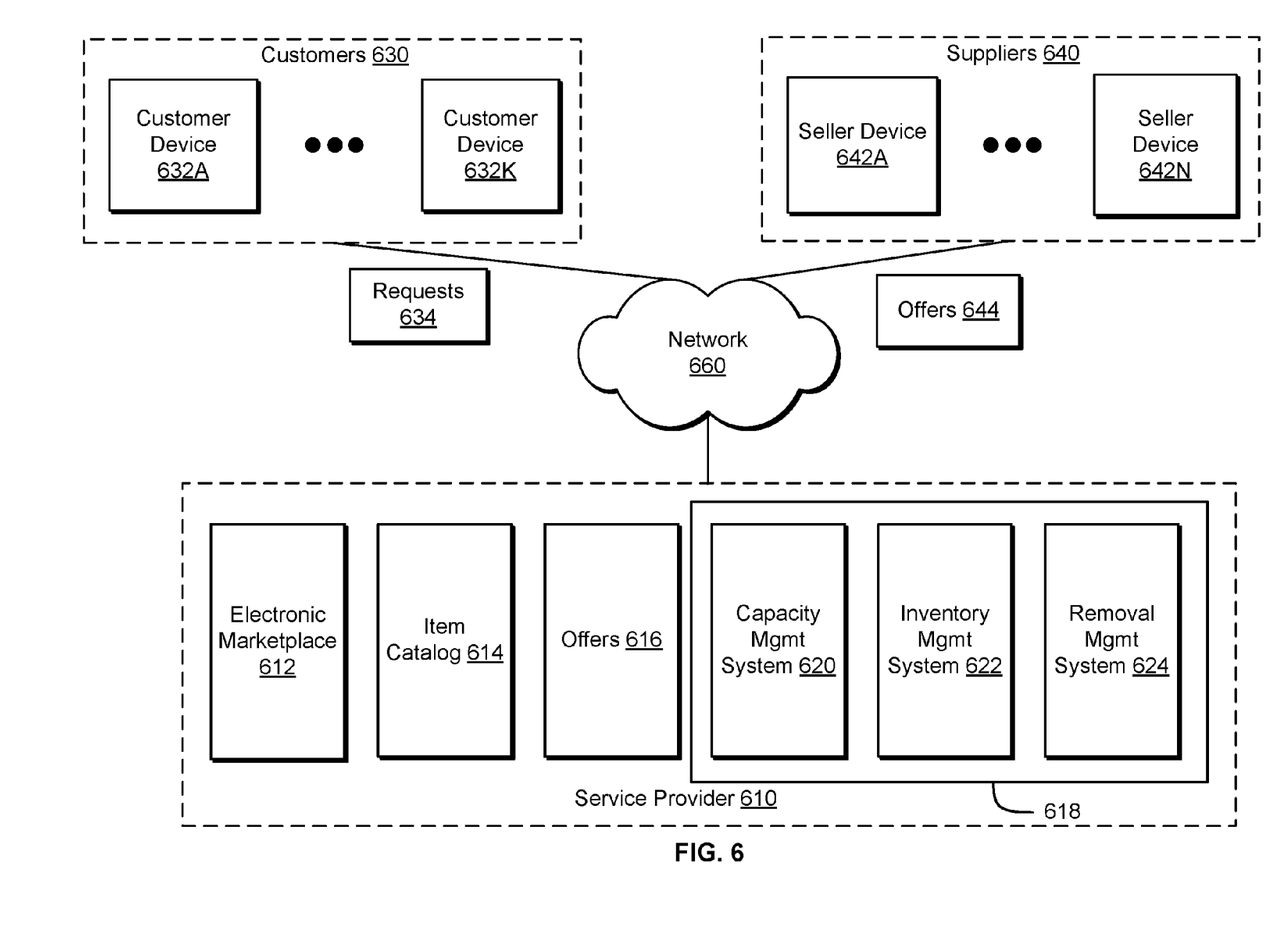
FIG. 6 illustrates an example computing environment associated with an electronic marketplace, according to embodiments.

A computing system, such as the computing system 210 of FIG. 2, may be implemented within a context of an electronic marketplace. FIG. 6 illustrates an example computing environment for implementing such a system in the context of an electronic marketplace. In particular, a service provider 610 of an electronic marketplace 612 may implement a computing system 618 on a service provider computing resource to generate removal plans associated with removing inventoried items over planning horizons.

The electronic marketplace 612 may offer different items. Offered items may be cataloged in an item catalog 614. In addition, the offered items may be ordered from the electronic marketplace 612 according to offers 616. The offers 616 may use data from the item catalog 614 to describe some of the item attributes and offer attributes.

A network-based document (e.g., a web page) of the electronic marketplace 612 may be associated with an item. For example, the network-based resource document may allow suppliers 640 and/or the service provider 610 to provide information for ordering an item. This may include the suppliers listing offers 644 at the electronic marketplace 612. The network-based document may also allow customers 630 to review this information and make an order or purchase decision. The customers 630 may, for example, submit requests 634 for offers. In an example, the network-based resource document may present information from the item catalog 614 for the offers 616.

The computing system 618 may be configured to generate a removal plan for a planning horizon. The removal plan may include a target of inventoried items to remove by the end of the planning horizon and a set of actions indicating quantities of items to remove through different removal channels within different time periods of the planning horizon. In an example, the computing system 618 may implement (e.g., integrate or interface with) a capacity management system 620 to manage capacity levels, an inventory management system 622 to manage inventory levels, and a removal management system 624 to manage usage of removal channels.

As such, the service provider 610 may operate the electronic marketplace 612 to facilitate interactions between the service provider 610, the customers 630, and the suppliers 640 over a network 660. Each one of the suppliers 640 may operate one or more supplier devices 642A-N to access the electronic marketplace 612 and perform various supplier-related transactions. A customer may be an item recipient, a buyer, or any user reviewing, browsing, ordering, obtaining, purchasing, or returning an item of a supplier. Each one of the customers 630 may operate one or more customer devices 632A-K to access the electronic marketplace 612 and perform various customer-related transactions. By implementing the computing system 618, the service provider 610 may remove optimal levels of inventoried items over time.

Figure 7:
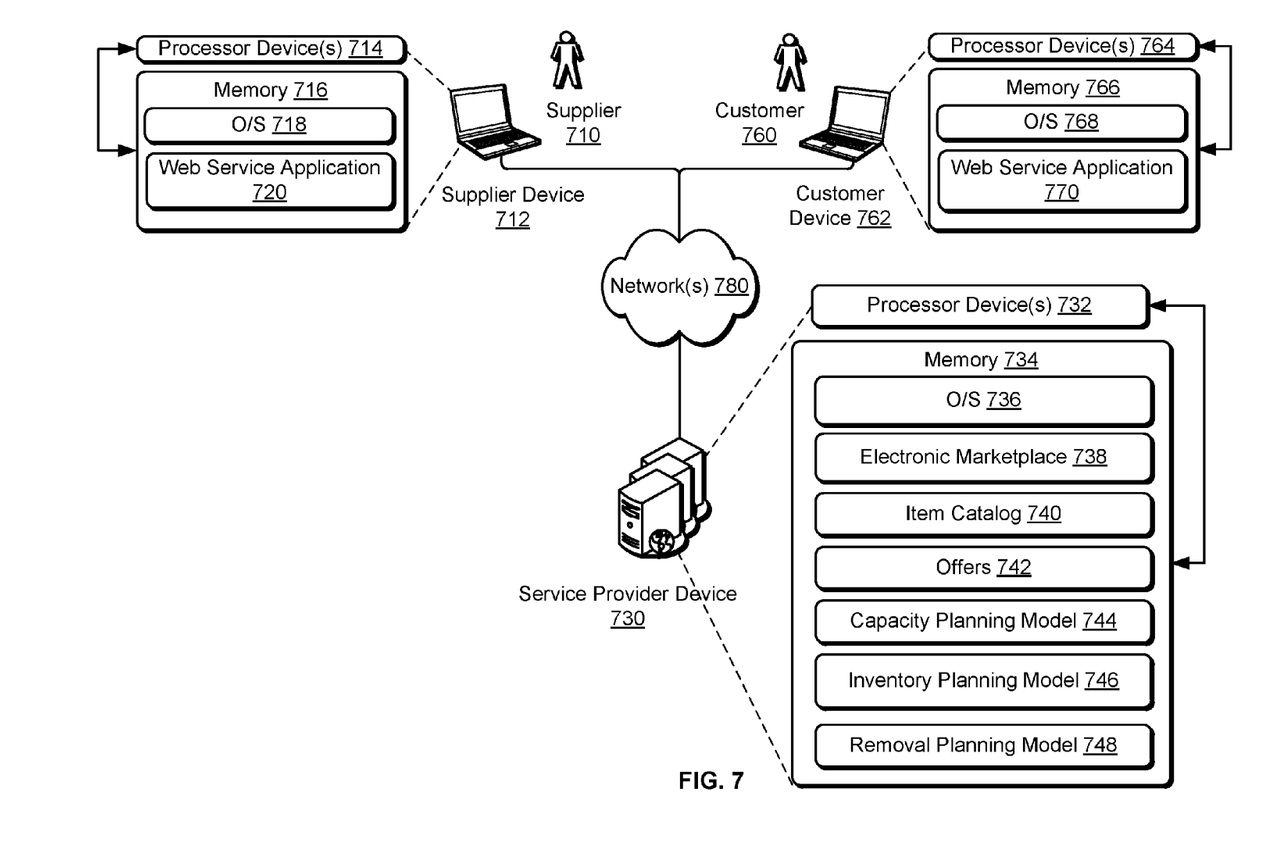
FIG. 7 illustrates an example architecture for providing a network-based resource, including at least one user device and/or one or more service provider devices connected via one or more networks, according to embodiments.

Turning to FIG. 7, that figure illustrates an example end-to-end computing environment for generating removal plans. In this example, a service provider may implement a computing system, such as the computing system of FIG. 6, within the context of, for example, an electronic marketplace available to users, such as to the customers 630 and the suppliers 640 of FIG. 6.

In a basic configuration, a supplier 710 may utilize a supplier device 712 to access local applications, a web service application 720, a supplier account accessible through the web service application 720, a web site or any other network-based resources via one or more networks 780. In some aspects, the web service application 720, the web site, and/or the supplier account may be hosted, managed, and/or otherwise provided by one or more computing resources of the service provider, such as by utilizing one or more service provider devices 730. The supplier 710 may use the local applications and/or the web service application 720 to interact with the network-based resources of the service provider and perform supplier-related transactions. These transactions may include, for example, offering items for sale, obtaining items back through removal channels, and/or providing information about supplier-related variables and constraints.

In some examples, the supplier device 712 may be any type of computing devices such as, but not limited to, a mobile phone, a smart phone, a personal digital assistant (PDA), a laptop computer, a thin-client device, a tablet PC, etc. In one illustrative configuration, the supplier device 712 may contain communications connection(s) that allow the supplier device 712 to communicate with a stored database, another computing device or server, supplier terminals, and/or other devices on the networks 780. The supplier device 712 may also include input/output (I/O) device(s) and/or ports, such as for enabling a connection with a keyboard, a mouse, a pen, a voice input device, a touch input device, a display, speakers, a printer, etc.

The supplier device 712 may also include at least one or more processing units (or processor device(s)) 714 and one memory 716. The processor device(s) 714 may be implemented as appropriate in hardware, computer-executable instructions, firmware, or combinations thereof. Computer-executable instructions or firmware implementations of the processor device(s) 714 may include computer-executable or machine-executable instructions written in any suitable programming language to perform the various functions described.

The memory 716 may store program instructions that are loadable and executable on the processor device(s) 714, as well as data generated during the execution of these programs. Depending on the configuration and type of supplier device 712, the memory 716 may be volatile (such as random access memory (RAM)) and/or non-volatile (such as read-only memory (ROM), flash memory, etc.). The supplier device 712 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 716 may include multiple different types of memory, such as static random access memory (SRAM), dynamic random access memory (DRAM), or ROM.

Turning to the contents of the memory 716 in more detail, the memory may include an operating system (O/S) 718 and the one or more application programs or services for implementing the features disclosed herein including the web service application 720. In some examples, the supplier device 712 may be in communication with the service provider devices 730 via the networks 780, or via other network connections. The networks 780 may include any one or a combination of many different types of networks, such as cable networks, the Internet, wireless networks, cellular networks, and other private and/or public networks. While the illustrated example represents the supplier 710 accessing the web service application 720 over the networks 780, the described techniques may equally apply in instances where the supplier 710 interacts with the service provider devices 730 via the supplier device 712 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a customer 760 may utilize customer device 762 to access local applications, a web service application 770, a customer account accessible through the web service application 770, a web site, or any other network-based resources via the networks 780. In some aspects, the web service application 770, the web site, and/or the user account may be hosted, managed, and/or otherwise provided by the service provider devices 730 and may be similar to the web service application 720, the web site accessed by the computing device 712, and/or the supplier account, respectively.

The customer 760 may use the local applications and/or the web service application 770 to conduct transactions with the network-based resources of the service provider. These transactions may include, for example, searching for items offered by the supplier 710 at the network-based resources, receiving offers for the items, ordering items through sale and removal channels, returning items, and other transactions.

In some examples, the customer device 762 may be configured similarly to the supplier device 712 and may include at least one or more processing units (or processor device(s)) 764 and one memory 766. The processor device(s) 764 may be implemented as appropriate in hardware, computer-executable instructions, firmware, or combinations thereof similarly to the processor device(s) 714. Likewise, the memory 766 may also be configured similarly to the memory 716 and may store program instructions that are loadable and executable on the processor device(s) 764, as well as data generated during the execution of these programs. For example, the memory 766 may include an operating system (O/S) 768 and the one or more application programs or services for implementing the features disclosed herein including the web service application 770.

As described briefly above, the web service applications 720 and 770 may allow the supplier 710 and customer 760, respectively, to interact with the service provider devices 730 to conduct transactions involving items. The service provider devices 730, perhaps arranged in a cluster of servers or as a server farm, may host the web service applications 720 and 770. These servers may be configured to host a web site (or combination of web sites) viewable via the computing devices 712 and 762. Other server architectures may also be used to host the web service applications 720 and 770. The web service applications 720 and 770 may be capable of handling requests from many suppliers 710 and customers 760, respectively, and serving, in response, various interfaces that may be rendered at the computing devices 712 and 762 such as, but not limited to, a web site. The web service applications 720 and 770 may interact with any type of web site that supports interaction, including social networking sites, electronic retailers, informational sites, blog sites, search engine sites, news and entertainment sites, and so forth. As discussed above, the described techniques may similarly be implemented outside of the web service applications 720 and 770, such as with other applications running on the computing devices 712 and 762, respectively.

The service provider devices 730 may, in some examples, provide network-based resources such as, but not limited to, applications for purchase and/or download, web sites, web hosting, client entities, data storage, data access, management, virtualization, etc. The service provider devices 730 may also be operable to provide web hosting, computer application development, and/or implementation platforms, or combinations of the foregoing to the supplier 710 and customer 760.

The service provider devices 730 may be any type of computing device such as, but not limited to, a mobile phone, a smart phone, a personal digital assistant (PDA), a laptop computer, a desktop computer, a server computer, a thin-client device, a tablet PC, etc. The service provider devices 730 may also contain communications connection(s) that allow service provider devices 730 to communicate with a stored database, other computing devices or servers, supplier terminals, and/or other devices on the network 780. The service provider devices 730 may also include input/output (I/O) device(s) and/or ports, such as for enabling connection with a keyboard, a mouse, a pen, a voice input device, a touch input device, a display, speakers, a printer, etc.

Additionally, in some embodiments, the service provider devices 730 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the service provider devices 730 may be in communication with the computing devices 712 and 762 via the networks 780, or via other network connections. The service provider devices 730 may include one or more servers, perhaps arranged in a cluster, or as individual servers not associated with one another.

In one illustrative configuration, the service provider devices 730 may include at least one or more processing units (or processor devices(s)) 732 and one memory 734. The processor device(s) 732 may be implemented as appropriate in hardware, computer-executable instructions, firmware, or combinations thereof. Computer-executable instruction or firmware implementations of the processor device(s) 732 may include computer-executable or machine-executable instructions written in any suitable programming language to perform the various functions described.

The memory 734 may store program instructions that are loadable and executable on the processor device(s) 732, as well as data generated during the execution of these programs. Depending on the configuration and type of the service provider devices 730, the memory 734 may be volatile (such as random access memory (RAM)) and/or non-volatile (such as read-only memory (ROM), flash memory, etc.). The service provider devices 730 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 734 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 734 in more detail, the memory may include an operating system (O/S) 736, code for an electronic marketplace 738, data related to an item catalog 740, data related to available offers 742, code for a capacity planning model 744, code for an inventory planning model 746, and code for a removal planning model 748. Although FIG. 7 illustrates the various data as stored in the memory 734, this data or portion of the data may be additionally or alternatively stored at a storage device remotely accessible to the service provider devices 730.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
generating, by a computing system based at least in part on a first model, a first estimate associated with removing a first volume of items from an inventory space during a planning horizon through a removal channel;
accessing, by the computing system, a decision to remove the volume of items, the decision based at least in part on the first estimate and a second estimate, the second estimate associated with adding a space capacity for inventorying a second volume of items that is equivalent to the first volume, the second estimate generated by a second computing system based at least in part on a second model that is different than the first model, the second estimate received by the computing system from the second computing system based at least in part on a transmission of the first estimate from the computing system to the second computing system;
generating, by the computing system based at least in part on the decision, a constraint on an inventory level of an item during a next time period of a plurality of time periods that form the planning horizon, the constraint based at least in part on the first volume of the items to be removed during the planning horizon; and
estimating, by the computing system, a quantity of the item to remove within the next time period through the removal channel, the quantity estimated based at least in part on a search that uses an objective function, the objective function using the constraint and a number of variables to increase or decrease an optimization parameter, the objective function using the quantity of the item as one of the variables,
wherein usage of the removal channel during the next time period is controlled based at least in part on the quantity of the item, wherein the usage comprises physical removal of units of the item from the inventory space.

2. The computer-implemented method of claim 1, wherein generating the first estimate comprises generating a smallest possible loss of removing the first volume of items as part of removing inventoried items through a plurality of removal channels of an electronic marketplace associated with the inventory space, and wherein the plurality of removal channels comprise a markdown channel of the electronic marketplace.

3. The computer-implemented method of claim 1, wherein the constraint comprises a penalty that is set based at least in part on the first estimate, wherein estimating the quantity of the item to remove comprises increasing or decreasing the optimization parameter based at least in part on the penalty in the objective function and setting the quantity of the item to remove as one of the variables.

4. The computer-implemented method of claim 3, wherein generating the first estimate comprises varying the penalty within a range and using the objective function to find the first estimate, and wherein the penalty is set as a value within the range corresponding to finding the first estimate.

5. The computer-implemented method of claim 3, further comprising:
upon an elapse of the next time period, accessing information about an actual quantity of the item removed within the next time period;
updating the penalty based at least in part on the actual quantity; and
estimating a next quantity of the item to remove within a subsequent time period based at least in part on the penalty being updated.

6. The computer-implemented method of claim 5, wherein the penalty varies within a range, and wherein updating the penalty comprises increasing or decreasing the optimization parameter based at least in part on a bisection search within the range.

7. The computer-implemented method of claim 1, wherein estimating the quantity based at least in part on the search comprises recursively estimating quantities of the item to remove in future time periods of the planning horizon, based at least in part on the constraint.

8. The computer-implemented method of claim 1, further comprising estimating a removal value associated with removing the quantity of the item within the next time period.

9. The computer-implemented method of claim 8, wherein the removal channel comprises a markdown channel, wherein controlling the usage of the markdown channel is based at least in part on the quantity to remove through the markdown channel within the next time period and based at least in part on the removal value.

10. A computing system, comprising:
one or more processors;
one or more computer-readable media comprising instructions that, upon execution with the one or more processors, cause the computing system to:
generate, based at least in part on a first model, a first estimate for removing a volume of items through a plurality of removal channels to free a space capacity of an inventory space over a planning horizon;
receive a decision to remove the volume of items, the decision based at least in part on the first estimate and a second estimate, the second estimate associated with adding an inventory capacity that is equivalent to the space capacity to be freed, the second estimate generated by a second computing system based at least in part on a second model that is different than the first model, the second estimate received by the computing system from the second computing system based at least in on a transmission of the first estimate from the computing system to the second computing system;
generate, based at least in part on the decision, a penalty associated with removing less than the volume of items over the planning horizon; and
estimate a quantity of an inventoried item to be removed during a next time period of a plurality of time periods that form the planning horizon through a removal channel of the plurality of removal channels, the quantity estimated based at least in part on a search that uses an objective function, the objective function using the penalty as a variable and a number of other variables to increase or decrease an optimization parameter, the objective function using the quantity of the item as one of the other variables,
wherein at least one parameter associated with using the removal channel during the next time period is controlled based at least in part on the quantity of the inventoried item, wherein using the removal channel comprises physical removal of units of the item from the inventory space.

11. The computing system of claim 10, wherein the instructions, upon execution with the one or more processors, further cause the computing system to:
provide the quantity of the inventoried item to be removed to a third computing system that is configured to generate a plan for the physical removal of units of the item during the next time period.

12. The computing system of claim 11, wherein the removal channel comprises a markdown channel, wherein the at least one parameter is part of the plan and comprises a markdown price of the item, and wherein the instructions, upon execution with the one or more processors, further cause the computing system to:
generate a removal value associated with removing the inventoried item;
provide the removal value to the third computing system, wherein the plan is based at least in part on the quantity of the inventoried item to be removed and based at least in part on the removal value.

13. The computing system of claim 10, wherein the instructions, upon execution with the one or more processors, further cause the computing system to:
determine an actual quantity of the inventoried item removed by an end of the next time period;
update the penalty based at least in part on the actual quantity; and
estimate a next quantity of the inventoried item to be removed in a subsequent time period of the planning horizon, wherein the next quantity is recursively estimated based at least in part on the penalty and based at least in part on remaining subsequent time periods of the planning horizon.

14. The computing system of claim 10, wherein the decision is received from the second computing system that is configured to generate a plan to add the inventory capacity, and wherein the first estimate is updated and provided to the second computing system on a periodic basis.

15. The computing system of claim 10, wherein at least one of generating the first estimate or estimating the quantity of the inventoried item are performed based at least in part on a request from another computing system, wherein the request is received based at least in part on an application programming interface.

16. The computer-implemented method of claim 1, wherein estimating the quantity of the item to remove comprises based at least in part on the search comprises recursively searching for the quantity by at least starting with a last time period occurring at the end of the planning horizon, moving through one or more time periods of the planning horizon, and ending at the next time period, and using the objective function in each of the time periods based at least in part on the updated constraint, the variables, and the optimization parameter, and wherein an updated constraint in a particular time period is set based at least in part on the recursive searching in a subsequent time period.

* * * * *